US009413602B2

(12) United States Patent
Mohandas et al.

(10) Patent No.: US 9,413,602 B2
(45) Date of Patent: Aug. 9, 2016

(54) SYSTEM, METHOD, AND APPARATUS FOR NETWORK FABRIC CONFIGURATION IN DATA COMMUNICATION NETWORKS

(71) Applicant: Alcatel-Lucent USA Inc., Murray Hill, NJ (US)

(72) Inventors: Sindhu K. Mohandas, Thousand Oaks, CA (US); Pramoda V. Nallur, Midvale, UT (US); Jeremy W. Touve, Newhall, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 183 days.

(21) Appl. No.: 14/257,531

(22) Filed: Apr. 21, 2014

(65) Prior Publication Data

US 2014/0372576 A1 Dec. 18, 2014

Related U.S. Application Data

(60) Provisional application No. 61/833,979, filed on Jun. 12, 2013.

(51) Int. Cl.
*H04L 12/24* (2006.01)
*H04L 12/931* (2013.01)

(52) U.S. Cl.
CPC .......... *H04L 41/0803* (2013.01); *H04L 49/354* (2013.01); *H04L 49/65* (2013.01); *Y02B 60/43* (2013.01)

(58) Field of Classification Search
CPC ..................... H04L 49/00–49/70; Y02B 60/43
See application file for complete search history.

(56) References Cited

U.S. PATENT DOCUMENTS

| | | | | |
|---|---|---|---|---|
| 7,756,027 B1* | 7/2010 | Reddy | ................. | H04L 41/0806 370/230 |
| 8,046,450 B1* | 10/2011 | Schloss | ............... | H04L 41/0809 709/220 |
| 8,443,065 B1* | 5/2013 | White | ..................... | H04L 45/02 370/254 |
| 2009/0109998 A1* | 4/2009 | Vinayagam | ............. | H04L 49/30 370/465 |
| 2013/0325777 A1* | 12/2013 | Petre | ...................... | G06N 3/049 706/26 |

* cited by examiner

*Primary Examiner* — Nicholas Taylor
*Assistant Examiner* — Clayton R Williams
(74) *Attorney, Agent, or Firm* — Loza & Loza, LLP

(57) ABSTRACT

An auto fabric configuration (AFC) mode is provided to enable network elements, when added to a data communication network, to discover each other, using TLVs added to standard protocols. The AFC mode further allows for automatic configuration of the network fabric. For example, core features, such as link aggregation, Virtual Local Area Networks (VLANs) and Shortest Path Bridging (SPB) adjacencies, can be automatically configured.

17 Claims, 7 Drawing Sheets

SYSTEM, METHOD, AND APPARATUS FOR NETWORK FABRIC CONFIGURATION IN DATA COMMUNICATION NETWORKS

CROSS-REFERENCE TO RELATED PATENTS

The present U.S. Utility Patent Application claims priority pursuant to 35 U.S.C. §119(e) to the following U.S. Provisional Patent Application, which is hereby incorporated herein by reference in its entirety and made part of the present U.S. Utility Patent Application for all purposes: U.S. Provisional Application Ser. No. 61/833,979, entitled "System, Method, and Apparatus for Fabric Detection and Creation in Data Communication Network," filed Jun. 12, 2013.

BACKGROUND OF THE INVENTION

1. Technical Field of the Invention

This invention relates generally to data communication networks and in particular to a manner of fabric detection and fabric configuration in a data communication network.

2. Description of Related Art

Data communication networks allow many different computing devices, for example, personal computers, IP telephony devices and/or servers, to communicate with each other and/or with various other network elements or remote servers attached to the network. For example, data communication networks may include, without limitation, Metro Ethernet or Enterprise Ethernet networks that support multiple applications including, for example, voice-over-IP (VoIP), data and video applications. Such networks regularly include many interconnected nodes, commonly known as switches or routers, for routing traffic through the network.

The various nodes are often distinguished based on their location within particular areas of the network, commonly characterizing two or three "tiers" or "layers," depending on the size of the network. Conventionally, a three tier network includes an edge layer, an aggregation layer and a core layer (whereas a two tier network includes only an edge layer and core layer). The edge layer of data networks includes edge (also called access) networks that typically provide connectivity from a customer or home network, such as a local area network, to a metro or core network. The edge/access layer is the entry point of the network, i.e., to which the customer network is nominally attached, and the switches residing at the edge layer are known as edge switches. Different types of edge networks include digital subscriber line, hybrid fiber coax (HFC), fiber to the home and various customer networks, such as campus and data center networks. Edge switches may perform, for example, L2 switching functions for the attached devices. The edge switches are generally connected to one or more end devices in the customer network, and also to an aggregation layer that terminates access links coming from multiple edge switches. Switches residing at the aggregation layer are known as aggregation switches. Aggregation switches may perform, for example, L2 switching and L3 routing of traffic received via the aggregate links from the edge switches. The aggregation layer is connected to a metro or core network layer that performs Layer 3/IP routing of traffic received from the aggregation switches (in a three tier network) or from edge switches (in a two tier network). As will be appreciated, nodes at each incremental layer of the network typically have larger capacity and faster throughput.

Currently, the switches in a data communication network are manually and independently configured for some core features, such as link aggregation, VLAN configuration and SPB configuration, to form the network fabric (network topology). For example, a network administrator typically manually determines what each port of a switch is connected to and then appropriately configures each of the ports. In a deployment, such as a campus or data center, the network administrator may have to manually configure hundreds of edge/aggregation and core switches.

SUMMARY

Embodiments of the present disclosure are directed to automatic network fabric configuration in data communication networks. A network element within the data communication network includes a plurality of ports, a processor and a memory storing computer-executable instructions performed by the processor. The computer-executable instructions include instructions for transmitting LLDP packets via at least one physical port of the plurality of physical ports, in which the LLDP packets include a TLV field indicating that an AFC mode is enabled on the at least one physical port. The computer-executable instructions further including instructions for receiving LLDP packets from a remote device on the at least one physical port, determining whether the AFC mode is enabled on the remote device based on the received LLDP packets, configuring the at least one physical port as a standalone port when the AFC mode is not enabled on the remote device and no Link Aggregation Control Protocol (LACP) packets are received from the remote device on the at least one physical port and automatically configuring a network fabric between the at least one physical port and the remote device when the AFC mode is enabled on the remote device.

In another embodiment, a non-transitory memory device includes a set of instructions for causing at least one processor to carry out operations for transmitting LLDP packets via at least one physical port of the plurality of physical ports of a network element within a data communication network, in which the LLDP packets include a TLV field indicating that an AFC mode is enabled on the at least one physical port. The instructions further cause the processor to carry out operations for receiving LLDP packets from a remote device on the at least one physical port, determining whether the AFC mode is enabled on the remote device based on the received LLDP packets, configuring the at least one physical port as a standalone port when the AFC mode is not enabled on the remote device and no Link Aggregation Control Protocol (LACP) packets are received from the remote device on the at least one physical port and automatically configuring a network fabric between the at least one physical port and the remote device when the AFC mode is enabled on the remote device.

In still another embodiment, a method includes transmitting Link Layer Discovery Protocol (LLDP) packets via at least one physical port of a plurality of physical ports of a first network element within a data communication network, in which the LLDP packets include a Type Length Value (TLV) field indicating that an auto fabric configuration (AFC) mode is enabled on the at least one physical port. The method further includes receiving LLDP packets from a second network element on the at least one physical port, determining whether the AFC mode is enabled on the second network element based on the received LLDP packets, configuring the at least one physical port as a standalone port when the AFC mode is not enabled on the second network element and no Link Aggregation Control Protocol (LACP) packets are received from the remote device on the at least one physical port and automatically configuring the network fabric between the at least one physical port and the second network element when the AFC mode is enabled on the second network element.

In some embodiments of any of the above apparatus/methods, the automatically configuring the network fabric further includes determining whether multiple physical ports of the plurality of physical ports are coupled to the same remote device and automatically forming a link aggregation group including the multiple physical ports when multiple physical ports are coupled to the same remote device.

In some embodiments of any of the above apparatus/methods, the determining whether multiple physical ports are coupled to the remote device further includes determining whether a system identification associated with the same remote device is included within the LLDP packets received on each of the multiple physical ports, and determining that the multiple physical ports are coupled to the remote devices when the system identification associated with the remote device is included within the LLDP packets received on each of the multiple physical ports.

In some embodiments of any of the above apparatus/methods, the automatically forming the link aggregation group further includes exchanging LACP packets with the remote device on the multiple physical ports to configure the link aggregation group.

In some embodiments of any of the above apparatus/methods, the automatically configuring the network fabric further includes initializing a link aggregation timer when the LLDP packets are received from the remote device on a particular one of the multiple physical ports, the link aggregation timer being used to define a link aggregation time during which the multiple physical ports can be identified and the link aggregation group can be formed.

In some embodiments of any of the above apparatus/methods, the automatically configuring the network fabric further includes reserving a group of Virtual Local Area Networks (VLANs) as Shortest Path Bridging (SPB) VLANs upon expiration of the link aggregation timer, assigning a first SPB VLAN as a control Backbone VLAN (BVLAN) and forming SPB adjacencies with the remote device via the control BVLAN.

In some embodiments of any of the above apparatus/methods, the automatically configuring the network fabric further includes initializing a SPB timer upon expiration of the link aggregation timer. The SPB timer defines a SPB time during which the SPB adjacencies are formed.

In some embodiments of any of the above apparatus/methods, the automatically configuring the network fabric further includes automatically transmitting Multiple VLAN Registration Protocol (MVRP) registration messages on the at least one physical port to discover and configure VLANs other than the SPB VLANs upon expiration of the SPB timer.

In some embodiments of any of the above apparatus/methods, the AFC mode is enabled on each of the plurality of physical ports upon boot up of the network element.

In some embodiments of any of the above apparatus/methods, the AFC mode is enabled on the at least one physical port upon manual configuration of the at least one physical port.

In some embodiments of any of the above apparatus/methods, the AFC mode is enabled on the at least one physical port and an AFC timer is initialized to define a time period during which the network fabric can be configured.

In some embodiments of any of the above apparatus/methods, a virtual chassis is formed with the remote device, and after the virtual chassis has been formed, the AFC mode is enabled on the at least one physical port.

In some embodiments of any of the above apparatus/methods, a configuration of the network fabric is automatically saved into a configuration file for the network element.

DETAILED DESCRIPTION OF THE INVENTION

Figure 1:
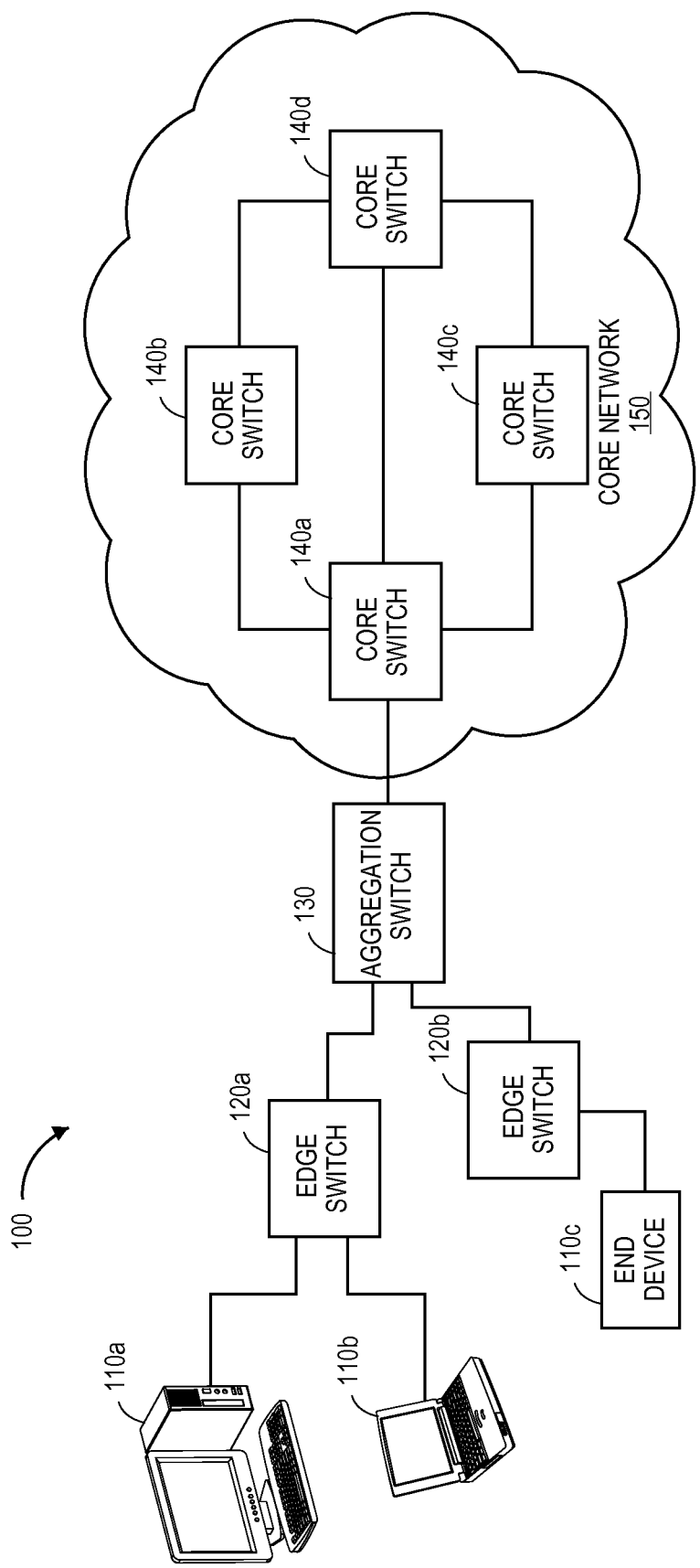
FIG. 1 illustrates a schematic block diagram of an exemplary data communication network.

The following abbreviations may be used herein:
AFC Auto Fabric Configuration
BVLAN Backbone VLAN
LACP Link Aggregation Control Protocol
LAG Link Aggregation Group
LLDP Link Layer Discovery Protocol
MVRP Multiple VLAN Registration Protocol
SPB Shortest Path Bridging
TLV Type, Length, Value
VLAN Virtual Local Area Network FIG. 1 illustrates a schematic block diagram of an exemplary data communication network 100. The data communication network 100 shown in FIG. 1 represents a "three tiered" Ethernet network, including an edge layer, an aggregation layer and a core layer. However, in other embodiments, the data communication network may include only the edge layer and core layer.

The edge layer includes edge switches 120a and 120b that provide connectivity from end devices 110a-110c within a customer network to the aggregation layer. The edge switches 120a and 120b may perform, for example, L2 switching functions for the end devices 110a-110c. The end devices 110a-110c may include, for example, desktop computers, laptop computers, and other customer/end devices, such as customer switches, servers and/or other customer/end devices in the customer network.

The aggregation layer includes aggregation switches, each terminating access links coming from multiple edge switches. For example, aggregation switch 130 can perform L2 switching and L3 routing of traffic received via the aggregate links from edge switches 120a and 120b. The aggregation layer is connected to a metro or core network 150 that includes a plurality of core switches 140a-140d that perform Layer 3/IP routing of traffic received from the aggregation switches 130.

In accordance with various embodiments, one or more of the edge switches 120a and 120b, aggregation switches 130 and core switches 140a-140d (referred to collectively herein as "network elements") are configured to operate in an auto fabric configuration (AFC) mode. In one embodiment, the AFC mode can be automatically enabled on all ports of a network element when the network element initially boots up. In this embodiment, the network element is typically not provided with a configuration file, and therefore, the AFC mode allows the network element to determine the network fabric configuration for all ports in runtime and save the network fabric configuration into a configuration file. In another embodiment, the AFC mode can be automatically or manually enabled on one or more ports of an existing network element that has already completed the initial boot-up to enable the existing network element to automatically detect another new network element that has been added to the data communication network and configure the network fabric to include the new network element.

Figure 2:
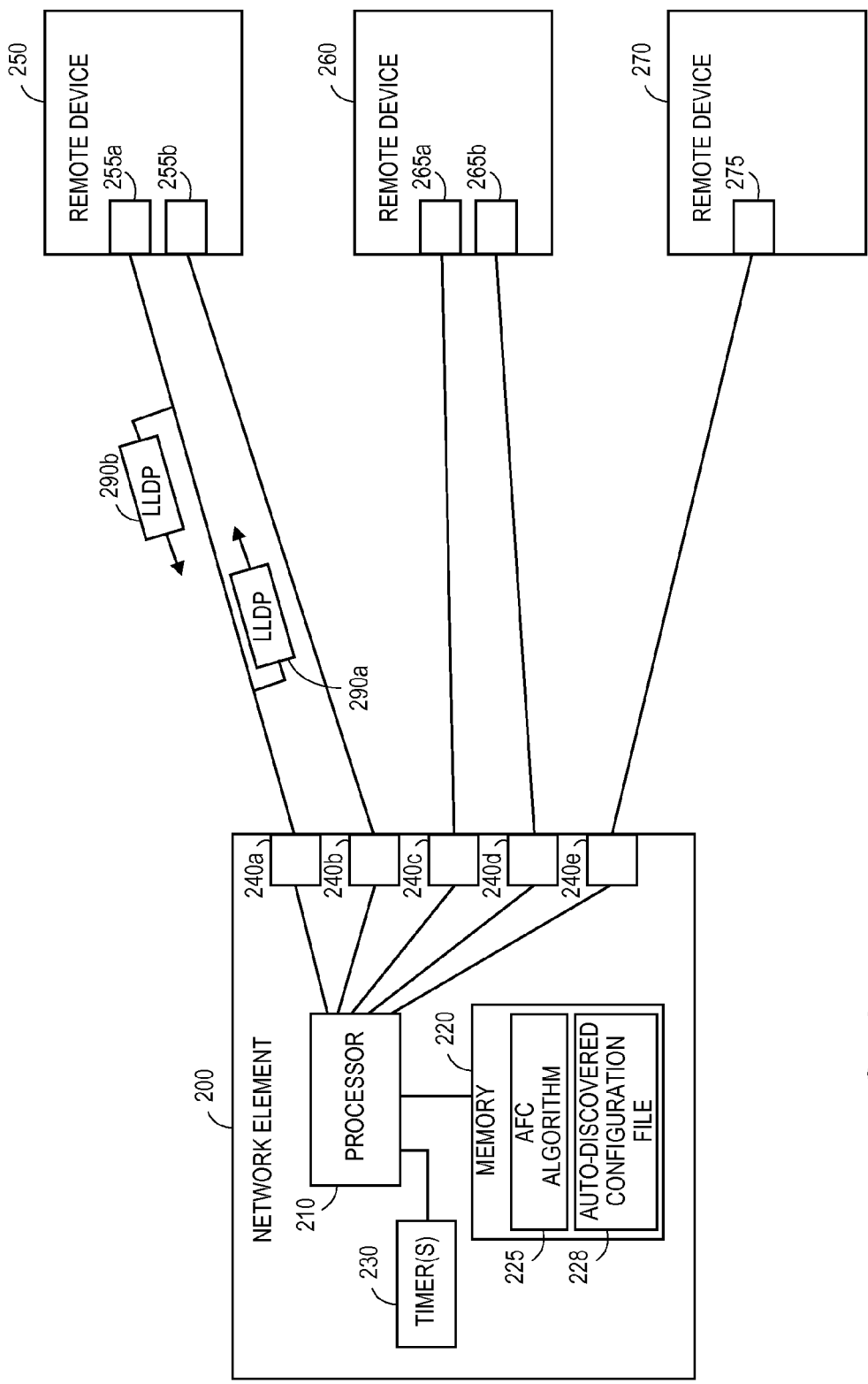
FIG. 2 illustrates a schematic block diagram of an embodiment of a network element within a data communication network.

FIG. 2 illustrates an exemplary embodiment of a network element 200 capable of operating in the AFC mode. The network element 200 includes a processor 210, a memory 220, one or more timers 230 and one or more ports 240a-240e. As used herein, the term "processor" is generally understood to be a device that drives a general-purpose computer, such as a PC. It is noted, however, that the processor 210 may include other processing devices, such as microcontrollers, Field Programmable Gate Arrays (FPGAs), Application Specific Integrated Circuits (ASICs), or a combination thereof.

The ports 240a-240e provide connections to links to external upstream and/or downstream switches or end devices. The ports 240a-240e may have the same physical interface type, such as copper ports (CAT-5E/CAT-6), multi-mode fiber ports (SX) or single-mode fiber ports (LX). In another embodiment, one or more of the ports 240a-240e may have one or more different physical interface types.

The memory 220 includes an AFC algorithm 225 that enables the network element 200 to operate in the AFC mode. By way of example, but not limitation, the memory 220 may include one or more a data storage device, random access memory (RAM), read only memory (ROM), flash memory, compact disc, floppy disc, ZIP™ drive, tape drive, database or other type of storage device or storage medium.

The AFC algorithm 225 is executable by the processor 210 to run an AFC discovery protocol on one or more of the ports 240a-240e to discover one or more remote devices 250, 260 and 270 (upstream and/or downstream switches or end devices) coupled to the ports 240a-240e. For example, in an exemplary embodiment, the discovery protocol includes a new TLV added to LLDP packets. In one embodiment, the TLV may be proprietary and/or vendor specific. In other embodiments, the TLV is a universal or standard TLV.

Upon discovering the remote devices 250, 260 and 270, the AFC algorithm 225 is further executable by the processor 210 to run one or more network fabric configuration protocols on the AFC enabled ports 240a-240e to configure the network fabric on the AFC enabled ports 240a-240e. Examples of network fabric configuration protocols may include one or more of LACP, SPB and MVRP.

In one embodiment, the AFC algorithm 225 supports in a global AFC mode to enable the AFC mode on all ports 240a-240e at link up. In another embodiment, the AFC algorithm 225 supports a per port AFC mode in which the AFC mode may be individually enabled or disabled on each port 240a-240e of the network element 200. In an exemplary embodiment, the global AFC mode is the default mode when the network element 200 boots-up without a configuration file. However, it should be understood that a user may manually disable one or more ports after the network element 200 enters the global AFC mode to switch the AFC algorithm 225 to the per port AFC mode.

In an exemplary operation, upon initialization of the AFC algorithm 225 at boot-up or upon selection of one or more ports 240a-240e, the AFC algorithm 225 is executable by the processor 210 to automatically send out LLDP packets 290a on link up of the AFC enabled ports 240a-240e. The LLDP packets 290a include a new TLV that indicates the AFC mode is enabled on those ports 240a-240e. In addition, in embodiments in which the AFC mode is vendor specific, the TLV may further indicate the particular AFC mode that the network element 200 is operating in. The information in the TLV allows any remote device 250, 260 and/or 270 that is also AFC enabled for the particular AFC mode on one or more ports 255a, 255b, 265a, 265b and/or 275 that are coupled to the network element 200 to use a default set of parameters to automatically configure the network fabric between the network element 200 and the remote device(s) 250, 260 and 270.

Similarly, at boot-up or upon manual selection of one or more ports 255a, 255b, 265a, 265b, 275 that are AFC enabled on the remote devices 250, 260 and 270, the remote devices 250, 260 and 270 will also automatically send out LLDP packets 290b with the new TLV at link up. The AFC algorithm 225 is further executable by the processor 210 to discover the remote device(s) 250, 260 and 270 and determine whether the remote device(s) are AFC enabled based upon the received LLDP packets 290b. For example, based on the LLDP packets 290b received from remote device 250 via port 240a, the AFC algorithm 225 determines whether port 255a of the remote device 250 is AFC enabled (i.e., the same vendor and/or running the same version of the AFC algorithm) or is not AFC enabled (i.e., not the same vendor, running a different version of the AFC algorithm and/or not AFC capable).

After the AFC algorithm 225 discovers the remote devices 250, 260 and 270 coupled to the network element 200, the AFC algorithm 225 is further executable by the processor 210 to run one or more network fabric configuration protocols on the ports 240a-240e to configure the network fabric on the AFC enabled ports 240a-240e. In an exemplary embodiment, the AFC algorithm 225 is executable by the processor 210 to run LACP on the ports 240a-240e to determine whether a LAG should be formed between two or more of the ports 240a-240e. For example, the AFC algorithm 225 can detect and group together a set of AFC enabled ports (e.g., ports 240a and 240b) by determining that the ports 240a and 240b are connected to the same remote device 250. The process of determining whether or not one or more LAGs should be formed is hereinafter referred to as link aggregation discovery.

In order for the AFC algorithm 225 to determine whether a LAG should be formed, the ports 255a and 255b of the remote device should be either AFC enabled or manually configured for LACP. In embodiments in which the ports 255a and 255b of the remote device 250 are neither AFC enabled nor manually configured for LACP, no LACP packets are received from the remote device 250. In this embodiment, the AFC algorithm 225 configures ports 240a and 240b as standalone ports.

In embodiments in which the ports 255a and 255b of the remote device 250 are either AFC enabled or manually configured for LACP, LACP packets are received from the remote device 250. In this embodiment, the AFC algorithm 225 is further executable by the processor 210 to analyze the received LLDP and LACP packets on each of the ports 255a and 255b to determine whether the ports 255a and 255b belong to the same remote device 250, and therefore, ports 240a and 240b should be grouped into a LAG. For example, the AFC algorithm 225 can retrieve relevant information from LLDP packets, such as remote device identification information (e.g., remote system-id and system-name), and relevant information from LACP packets, such as the admin key, maximum number of links supported for a LAG and individual port add requests, to determine whether ports 240a and 240b should be grouped into a LAG. In an exemplary embodiment, the AFC algorithm 225 determines that a LAG should be formed between ports 240a and 240b if LACP packets are received on both of the ports 240a and 240b from the same remote device 250 with the same admin key.

If the AFC algorithm 225 determines that a LAG between ports 240a and 240b should be created, the AFC algorithm 225 is further executable by the processor 210 to send LACP packets on ports 240a and 240b to the remote device to form the LAG. Once a LAG is formed between ports 240a and 240b, in one embodiment, these ports are disabled for further link aggregation discovery. However, link aggregation discovery may continue on other ports 240c-240e until LAGs are formed or the ports are designated as standalone ports.

To ensure that all ports are timely configured, the timer(s) 230 can include a link aggregation discovery timer to define a window (time period) within which link aggregation discovery is performed. At the expiration of the link aggregation discovery timer, any port (e.g., port 240e) that has not been configured as part of a LAG is configured as a standalone port. For example, the AFC algorithm 225 may discover that port 240e is coupled to a port 275 (either AFC enabled or not AFC enabled) on a remote device 270. However, since no other port would be discovered coupled to the same remote device 270 within the link aggregation window, port 240e can be configured as a standalone port at the expiration of the link aggregation discovery timer. Likewise, ports 240c and 240d may be configured as standalone ports if ports 265a and 265b are not AFC enabled and no LACP packets are received on ports 240c and 240d before the expiration of the link aggregation discovery timer.

In an exemplary embodiment, the link aggregation discovery timer includes a first timer to define a system link aggregation discovery time and a second timer to define a port link aggregation discovery time. For example, at the expiration of the second timer, port 240e can be configured as a standalone port to expedite configuration of the port. However, port 240e can remain enabled for link aggregation discovery until the expiration of the first timer. As mentioned above, in one embodiment, any ports grouped together in a LAG prior to the expiration of the first timer are disabled for link aggregation discovery for the duration of the link aggregation discovery window.

Once the link aggregation discovery process is completed, the AFC algorithm 225 is executable by the processor 210 to enter an SPB discovery process. During the SPB discovery process, the AFC algorithm 225 reserves a predetermined group of, for example, 16 VLANs as SPB VLANs and assigns the first SPB VLAN as the control BVLAN. Intermediate System-to-Intermediate System (ISIS) protocol data units (PDUs), such as Hello PDUs and Link State PDUs, are exchanged with the remote devices 250, 260 and 270 via the control BVLAN to form SPB adjacencies with the remote devices 250, 260 and 270. The ports 240a-240e on which SPB adjacencies are discovered are configured as SPB ports, while remaining ports are configured as normal ports. In this embodiment, the timer(s) 230 can further include a SPB discovery timer to define a window (time period) within which the SPB adjacencies can be formed.

Once the link aggregation discovery and SPB discovery processes are complete, the AFC algorithm 225 is executable by the processor 210 to enter a VLAN configuration process. During the VLAN configuration process, the AFC algorithm enables MVRP to automatically transmit MVRP registration messages on the ports 240a-240e to advertise, discover, create and configure VLANs other than the SPB VLANs.

The results of the link aggregation discovery process and SPB discovery process (referred to collectively as the network fabric configuration) can be saved to an auto-discovered configuration file 228 in memory 220. After the completion of the VLAN configuration process, the network element 200 continues to boot up with the discovered network fabric configuration, along with any previously stored versions of the network fabric configuration if the network element 200 is performing a subsequent boot up after the initial boot up.

In one embodiment, if the AFC algorithm 225 enables a periodic "auto save" feature, the network fabric configuration can be automatically saved to the configuration file 228 periodically, as determined by the attributes of the "auto save" feature. In another embodiment, a user can enter a "write memory" command to save the network fabric configuration into the configuration file 228. In an exemplary embodiment, the "write memory" command makes the configuration file 228 permanent across reboots. In this embodiment, ports which have a configuration would not be eligible for AFC mode on the next boot up.

In still another embodiment, the timer(s) 230 can further include a VLAN discovery timer to define a window (time period) over which VLANs can be discovered and configured and/or an overall AFC timer to define a window (time period) over which the AFC algorithm 225 is running. In this embodiment, the network fabric configuration can be saved to the configuration file 228 upon expiration of the VLAN timer and/or the AFC timer.

During runtime, the AFC mode may further be enabled on one or more ports upon the occurrence of any new link up event involving those ports. For example, in an exemplary embodiment, when the processor 210 detects new link(s) coupled to one or more of the ports, the processor 210 can automatically execute the AFC algorithm 225 to enable the AFC mode on those ports. In another embodiment, a user can manually enable the AFC mode on one or more ports at link up of those ports.

Figure 3:
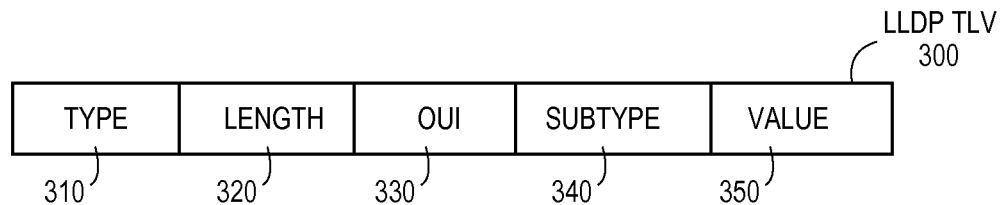
FIG. 3 illustrates an exemplary format of a Link Layer Discovery Protocol Type Length Value element.

An example of an LLDP TLV 300 is shown in FIG. 3. The LLDP TLV 300 includes a Type field 310 indicating the kind of field that this part of the LLDP packet represents (e.g., AFC mode), a Length field 320 indicating the size of the Value field 350, an OUI (Organizationally Unique Identifier) field 330 indicating the 24-bit string assigned to the System (e.g., network element), a Subtype field 340 indicating the particular AFC mode supported by the network element and the Value field 350 including the data for this part of the LLDP packet.

Figure 4A:
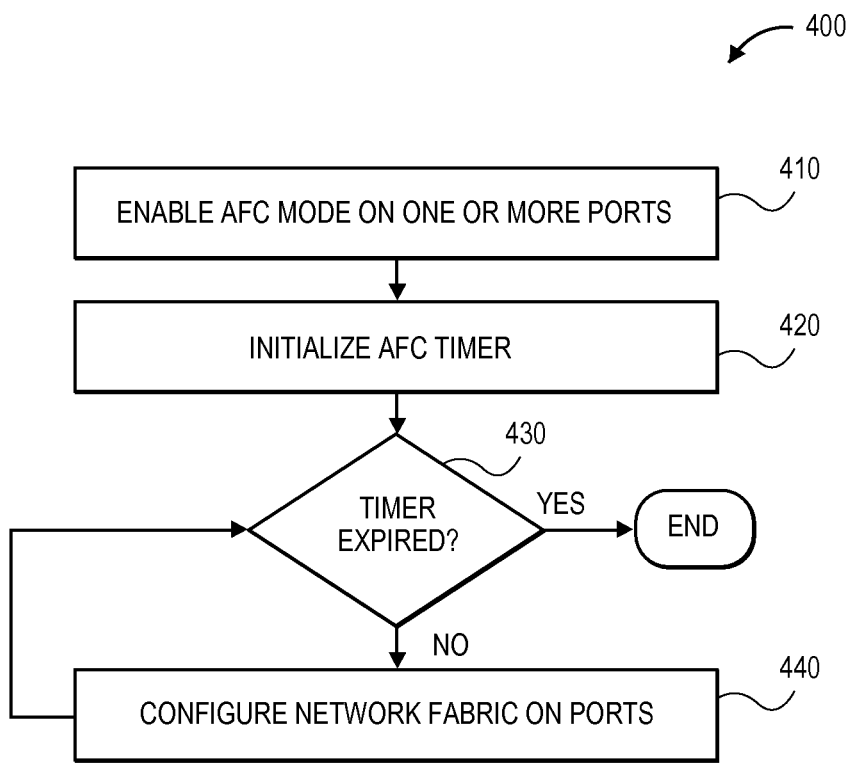
FIG. 4A illustrates an exemplary flow diagram of a method for automatically configuring a network fabric on one or more ports of a network element in a data communication network.

In an exemplary embodiment, the Value field 350 is an 8 byte/octet stream specifying:
    Bytes [0-5] The System MAC address
    Byte [6-7] Auto Fabric Feature Bitmap
        Bit 0—Auto Fabric Global Status (0 disabled, 1 enabled)
        Bit 1—Auto LACP
        Bit 2—Auto SPB
        Bit 3—Auto MVRP
        Bits [4-7]—Reserved
    Byte [7] Bits [0-7] Reserved FIG. 4A illustrates an exemplary flow diagram of a method 400 for automatically configuring a network fabric on one or more ports of a network element in a data communication network. The method begins at 410, where an AFC mode is enabled on one or more ports of a network element, such as an edge switch, aggregation switch or core switch within a data communication network. In one embodiment, the AFC mode is enabled automatically on all ports at boot up of the network element or on one or more ports upon detecting link up on one or more ports. In another embodiment, the AFC mode is enabled manually on one or more ports of the network element.

At 420, an AFC timer is initialized to define a time period over which the AFC mode is operating on the AFC enabled ports of the network element. At 430, a determination is made whether the AFC timer has expired. If not, at 440, a network fabric between the network element and at least one remote device in the data communication network is automatically configured on the AFC enabled ports. In an exemplary embodiment, during the duration of the AFC timer, the network element automatically: (1) discovers other (remote) devices coupled to the AFC enabled ports; (2) forms link aggregation groups between ports coupled to the same remote device; (3) forms SPB adjacencies with the remote devices; and (3) advertises and configures VLANs on the AFC enabled ports.

Figure 4B:
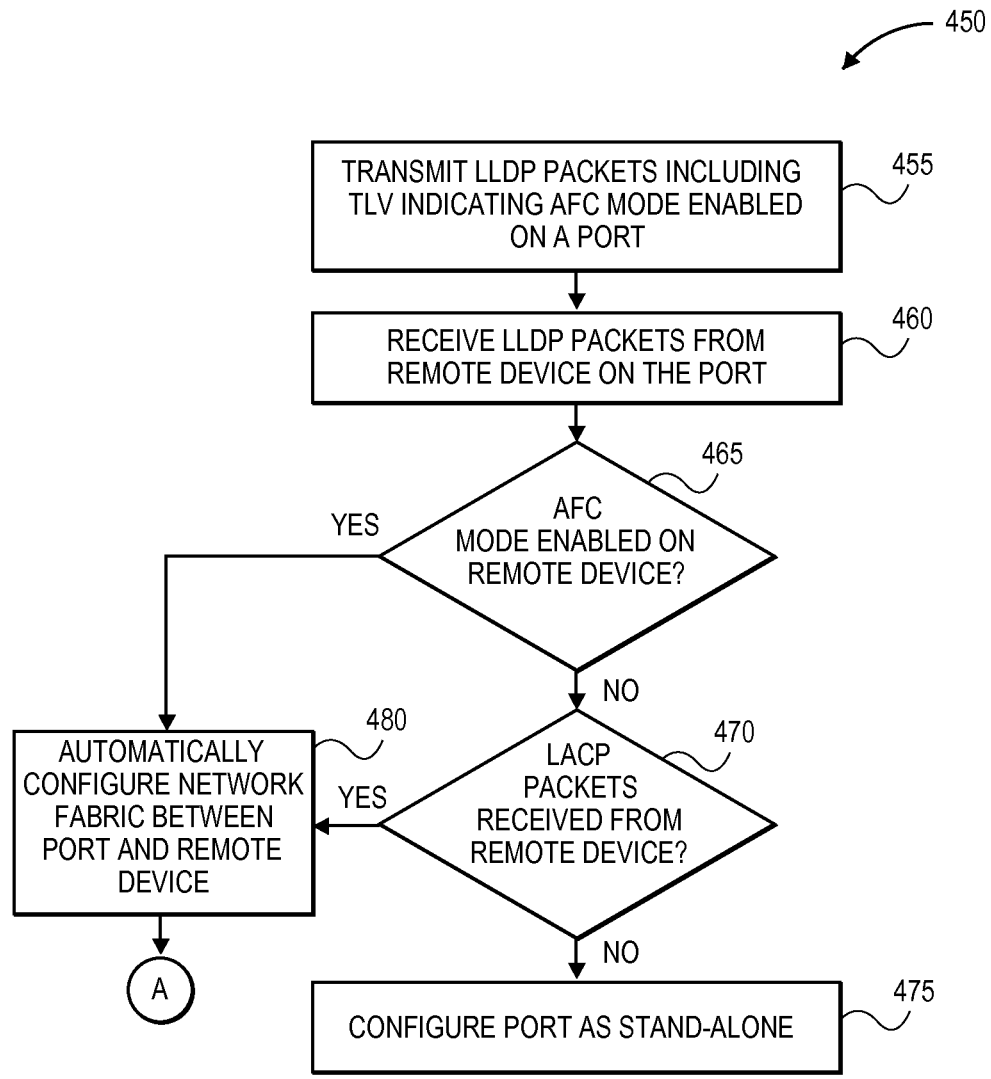
FIG. 4B illustrates an exemplary flow diagram of a more detailed method for automatically configuring a network fabric on one or more ports of a network element in a data communication network.

FIG. 4B illustrates an exemplary flow diagram of a more detailed method 450 for automatically configuring a network fabric on one or more ports of a network element in a data communication network. The method begins at 455, where a network element transmits LLDP packets including a TLV indicating that the AFC mode is enabled on a port of the network element. At 460, the network element further receives LLDP packets from a remote device on the port.

Based on the received LLDP packets, at 465, the network element determines whether the AFC mode is also enabled on the remote device. If the AFC mode is not enabled on the remote device, at 470, the network element determines whether LACP packets are received from the remote device. If the AFC mode is not enabled on the remote device and no LACP packets are received, at 475, the network element configures the port as a stand-alone port.

However, if the AFC mode is enabled on the remote device or LACP packets are received from the remote device, at 480, the network element automatically configures a network fabric between the port and the remote device. The network fabric configuration process is shown in more detail in FIGS. 5A-5C, as described below.

Figure 5A:
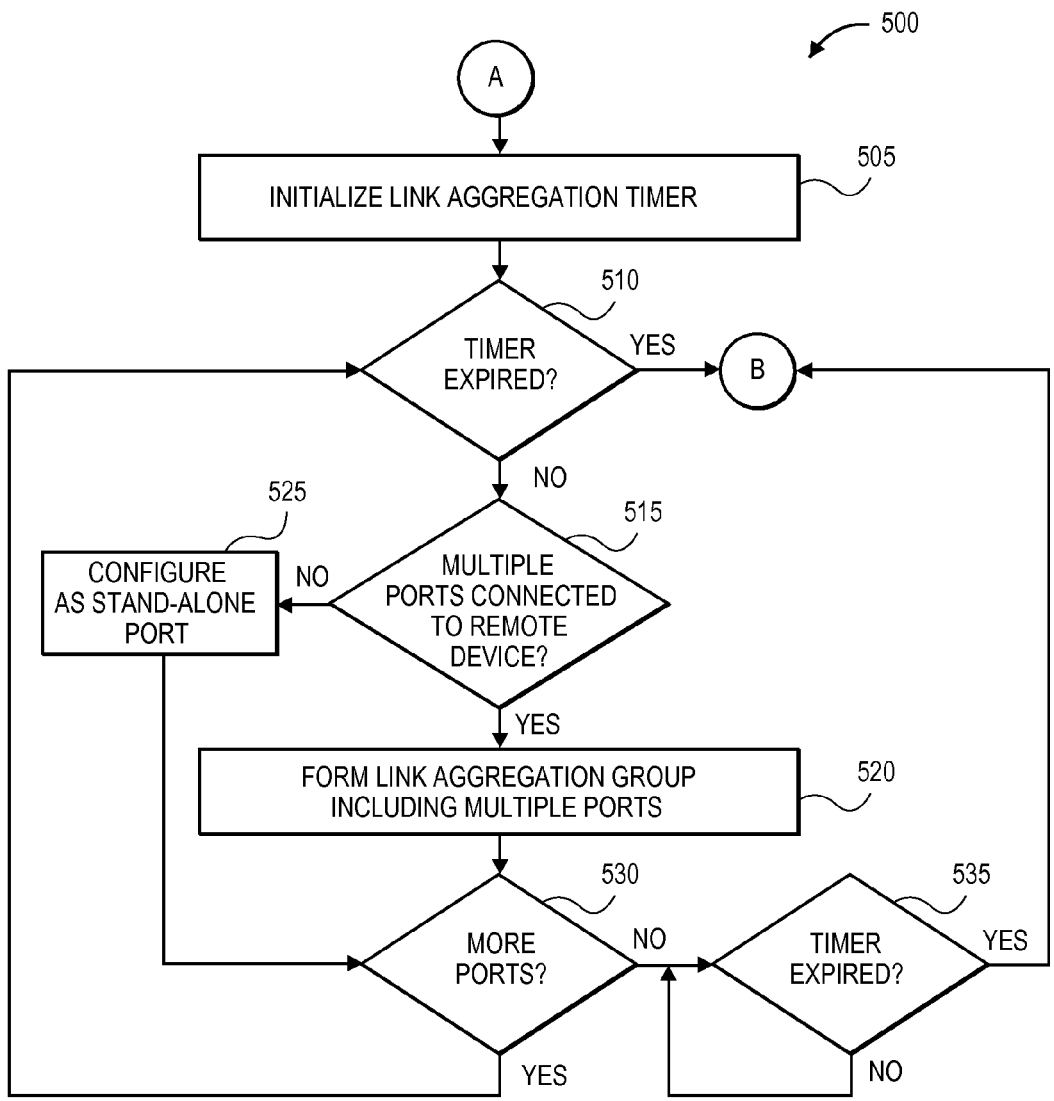
FIG. 5A illustrates an exemplary flow diagram of a method for automatically forming link aggregation groups.

FIG. 5A illustrates an exemplary flow diagram of a method 500 for automatically forming link aggregation groups during an AFC process. The method begins at 505, where a link aggregation discovery timer is initialized to define a time period over which link aggregation groups may be formed on the AFC enabled port(s) of a network element. At 510, a determination is made whether the link aggregation discovery timer has expired.

If the link aggregation discovery timer has not yet expired, at 515, the network element determines whether multiple ports are connected to the same remote device. In an exemplary embodiment, the network element determines that multiple ports are connected to the same remote device when LACP packets are received on each of the ports from the same remote device with the same admin key. If multiple ports are connected to the same remote device, at 520, the network element forms a LAG including those ports. If only a single port is coupled to a particular remote device, at 525, the network element configures that single port as a stand-alone port.

At 530, a determination is made whether there are more AFC enabled ports to be configured as either part of a LAG or as stand-alone ports. If so, the process repeats at step 510 and the network element continues to discover other LAGs on other ports on the network element for the duration of the link aggregation discovery timer. If all ports have been configured, at 535, the AFC process waits for the expiration of the link aggregation discovery timer to move onto the next phase of the AFC process, shown in FIG. 5B.

Figure 5B:
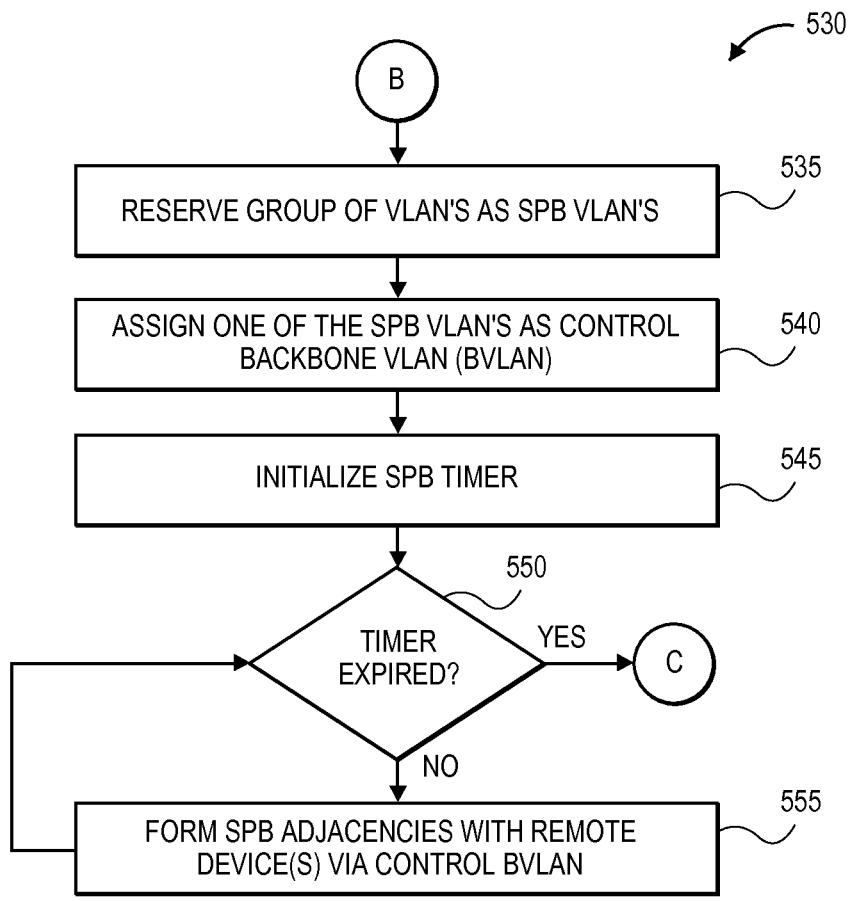
FIG. 5B illustrates an exemplary flow diagram of a method for automatically forming Shortest Path Bridging adjacencies.

FIG. 5B illustrates an exemplary flow diagram of a method 530 for automatically forming SPB adjacencies. After the link aggregation discovery timer timeout, the network element begins the SPB discovery process at 535, where a predetermined group of VLANs are reserved as SPB VLANs. At 540, one of the SPB VLAN is assigned as the control BVLAN. At 545, a SPB discovery timer is initialized to define a time period over which the SPB adjacencies may be formed. At 550, a determination is made whether the SPB discovery timer has expired.

It the SPB discovery timer has not expired, at 555, the network element forms SPB adjacencies with one or more remote devices on the AFC enabled ports via the control BVLAN. In an exemplary embodiment, ISIS PDUs, such as Hello PDUs and Link State PDUs, are exchanged with the remote device(s) via the control BVLAN to form SPB adjacencies with the remote devices. When the SPB discovery timer expires, the network element moves onto the next phase of the AFC process, shown in FIG. 5C.

Figure 5C:
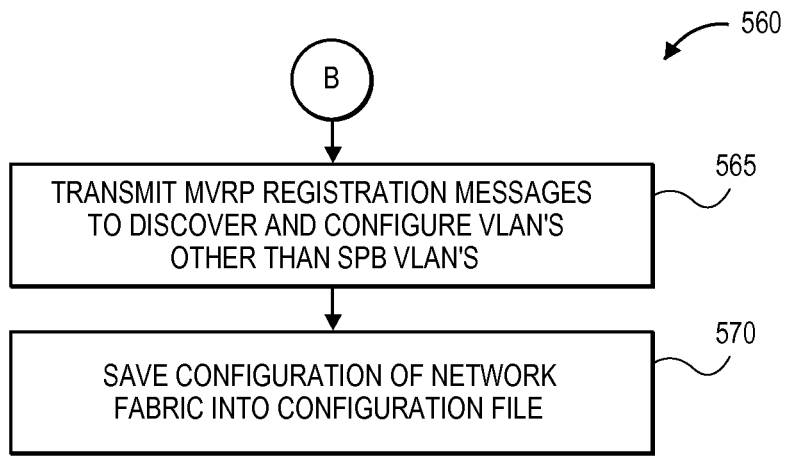
FIG. 5C illustrates an exemplary flow diagram of a method for automatically configuring Virtual Local Area Networks (VLANs)

FIG. 5C illustrates an exemplary flow diagram of a method 560 for automatically configuring Virtual Local Area Networks (VLANs) on the AFC enabled ports of a network element in a data communication network. The method begins at 565, where MVRP registration messages are automatically transmitted on the AFC enabled ports to advertise, discover, create and configure VLANs other than the SPB VLANs.

At 570, the results of the link aggregation discovery process shown in FIG. 5A and the SPB discovery process shown in FIG. 5B (referred to collectively as the network fabric configuration) are saved to an auto-discovered configuration file in the network element. In one embodiment, the network fabric configuration can be automatically saved periodically, as determined by the attributes of an "auto save" feature. In another embodiment, a user can enter a "write memory" command to save the network fabric configuration into the configuration file. In a further embodiment, the network fabric configuration can be saved upon the expiration of a VLAN discovery timer that defines a time period over which VLANs can be discovered and configured and/or an overall AFC timer that defines a time period over which the AFC process is running.

Figure 6:
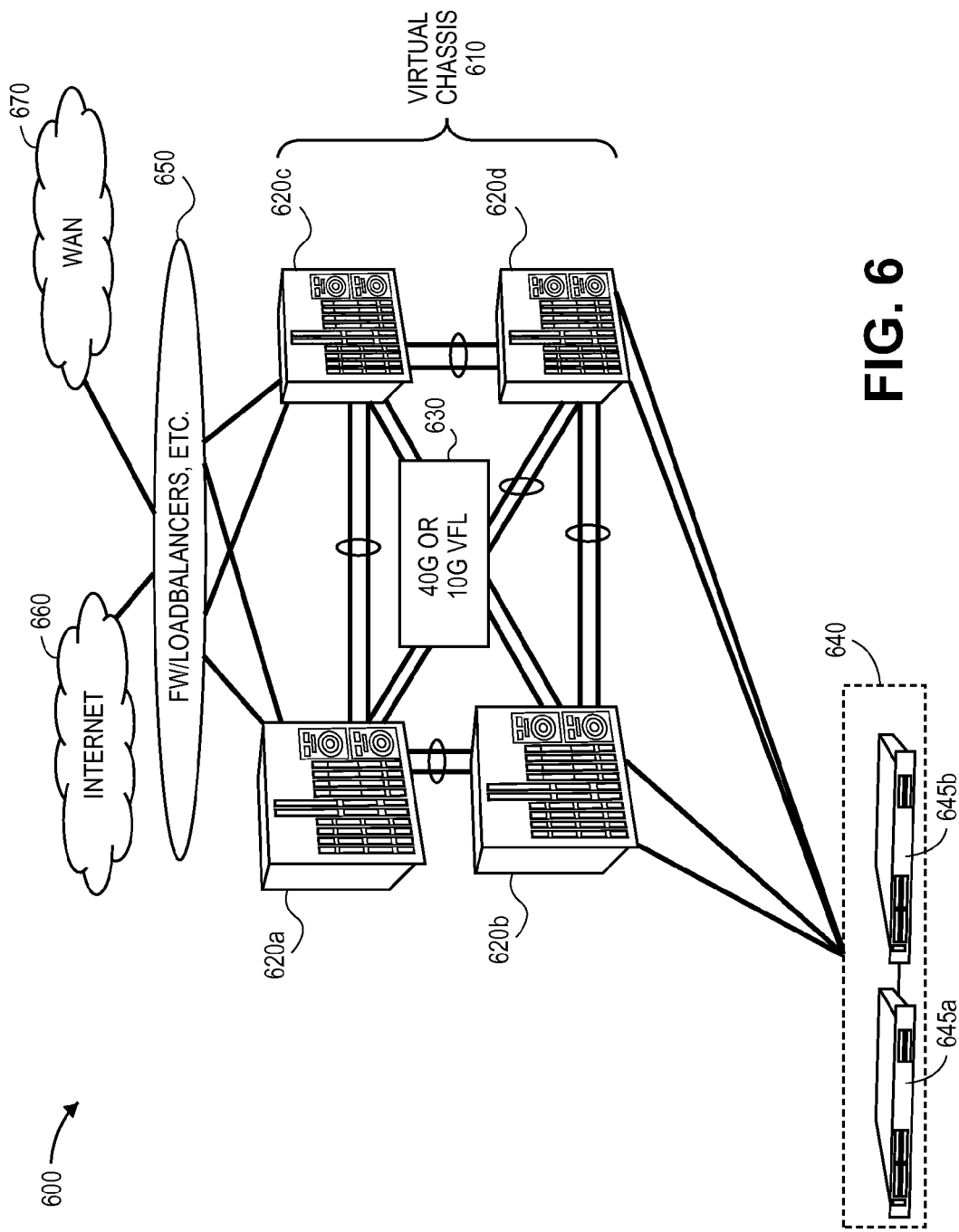
FIG. 6 illustrates a schematic block diagram of an exemplary data communication network including a virtual chassis configuration of various network elements on which the AFC mode may be enabled.

FIG. 6 is schematic block diagram of an exemplary data communication network 600 including a virtual chassis configuration of various network elements on which the AFC mode may be enabled. The data communication network 600 includes a virtual chassis 610 in the core network and a virtual chassis 640 in the edge network. The core virtual chassis 610 includes multiple Ethernet switches 620a, 620b, 620c and 620d that collectively form a single logical core switch. The core virtual chassis 610 has a Media Access Control (MAC) address and Internet Protocol (IP) address used by external nodes to forward traffic to the virtual chassis 610. Each switch 620a-620d within the core virtual chassis 610 is further assigned a unique identifier (i.e., IP address or other internal identifier for communication between the software components residents on the switches) used for routing between the switches 620a-620d.

The core switches 620a-620d are coupled together via a virtual fabric link (VFL) 630. The VFL 630 provides a connection for exchange of information between the switches 60a-630d regarding traffic forwarding, MAC addressing, multicast flows, address resolution protocol (ARP) tables, Layer 2 control protocols (e.g. spanning tree, Ethernet ring protection, logical link detection protocol), routing protocols (e.g. RIP, OSPF, BGP) and the status of links connecting the virtual chassis 610 to other upstream/downstream nodes. MAC address/forwarding tables for external nodes are maintained in each switch 620a-620d that enable bridging or routing packets between switches 620a-620d to reach external destination devices. For example, when a packet is to be routed from one switch (e.g., switch 620a) to another switch (e.g., switch 620b) within the virtual chassis 610 for transmission to an external destination device, a pre-pended header is added to the packet that includes the identifier of source switch 620a and the identifier of the destination switch 620b.

The switches 620a-620d are separate physical switches, each operable as a stand-alone switch. The switches 620a-620d may be encased together in a single physical chassis or in two or more separate physical chasses. Depending on the chassis configuration, the switches 620a-620d may be in the same geographic area, such as in a central office or data center, or may be separate geographic locations, such as different buildings or cities, to provide geo diversity.

In one embodiment, the switches 620a-620d are operating in an active/passive environment, in which not all of the external links are actively forwarding traffic at the same time (i.e., the external links on one switch are active, while the external links on other switches remain passive or "on standby"). In this embodiment, Spanning Tree Protocol (STP) may be used to bring an alternate path out of the standby mode and into an active state to re-establish a connection upon failure of an active link. In another embodiment, the switches 620a-620d are operating in an active/active environment, in which all external links are simultaneously active (i.e., the external links on all switches are active). In this embodiment, STP may not need to be run in some or all portions of the network topology for loop prevention (e.g., STP may still be utilized over the VFL 630 as well as over the links connecting the virtual chassis 610 to upstream nodes within the network 600).

Likewise, the edge virtual chassis 640 includes two top of rack (TOR) switches 645a and 645b that collectively form a single logical edge switch. The edge virtual chassis 640 is connected downstream to one or more end devices within a Local Area Network (LAN) and upstream to the core virtual chassis 610. The core virtual chassis 610 is connected downstream to the edge virtual chassis 640 and upstream to one or more other network nodes via one or more additional networks, such as the Internet 660 and/or a Wide Area Network (WAN) 670. The core switches 620a-620d and/or edge switches 645a and 645b may be connected to each other and other upstream and/or downstream nodes using Link Aggregation Groups (LAGs) or other trunks or links.

In an exemplary embodiment, one or both of the virtual chasses 610 and 640 have the ALC algorithm installed thereon to enable the network fabric to be automatically configured on ports thereof. For example, in an embodiment in which the core switches 620a-620d have already booted up and the two TOR switches 645a and 645b are added to the network, the virtual chassis 640 between the two TOR switches 645a and 645b is formed first prior to initiating the AFC mode. Once the virtual chassis 640 is formed, the AFC mode can then be automatically or manually enabled on the ports of the TOR switches 645a and 645b on link up to the core virtual chassis 610 to automatically detect the core virtual chassis 610 and configure the network fabric. Likewise, the AFC mode can also be enabled on the ports of the core switches 620a-620d on link up to the TOR switches 645a and 645b to enable the core virtual chassis 610 to automatically detect the edge virtual chassis 640 and configure the network fabric.

As used herein, the terms "automatic" and "automatically" indicate operation without direct human intervention. As further used herein, the terms "manual" and "manually" indicate operation with direct human intervention. In addition, as used herein, the term Link Aggregation Control Protocol (LACP) refers to the protocol defined in IEEE 802.1AX-IEEE 802.3ad released on Nov. 3, 2008. In addition, the term LAG, as used herein, refers to the bundling of several physical links between two nodes to form a single logical channel therebetween using the Link Aggregation Control Protocol (LACP). As also used herein, the term Link Layer Discovery Protocol (LLDP) refers to the protocol defined in IEEE 802.1ab released on Sep. 11, 2009. As further used herein, the term Multiple VLAN Registration Protocol (MVRP) refers to the protocol defined in IEEE 802.1ak released on Mar. 22, 2007. As still further used herein, the term Shortest Path Bridging refers to the protocol defined in IEEE 802.1aq released on Mar. 29, 2012.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term "operable to" indicates that an item includes one or more of processing modules, data, input(s), output(s), etc., to perform one or more of the described or necessary corresponding functions and may further include inferred coupling to one or more other items to perform the described or necessary corresponding functions.

As may be used herein, the term(s) "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, etc.). As may further be used herein, inferred connections (i.e., where one element is connected to another element by inference) includes direct and indirect connection between two items in the same manner as "connected to". As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may still further be used herein, inferred coupling (i.e., where one element is coupled to another element by inference) includes direct and indirect coupling between two items in the same manner as "coupled to".

Embodiments have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Similarly, flow diagram blocks may also have been arbitrarily defined herein to illustrate certain significant functionality. To the extent used, the flow diagram block boundaries and sequence could have been defined otherwise and still perform the certain significant functionality. One of average skill in the art will also recognize that the functional building blocks, and other illustrative blocks, modules and components herein, can be implemented as illustrated or by one or multiple discrete components, networks, systems, databases or processing modules executing appropriate software and the like or any combination thereof.

What is claimed is:

1. A network element within a data communication network, comprising:
    a plurality of physical ports;
    a processor; and
    a memory storing computer-executable instructions performed by the processor for:
        transmitting Link Layer Discovery Protocol (LLDP) packets via at least one physical port of the plurality of physical ports, the LLDP packets including a Type Length Value (TLV) field indicating that an auto fabric configuration (AFC) mode is enabled on the at least one physical port;
        receiving LLDP packets from a remote device on the at least one physical port;
        determining whether the AFC mode is enabled on the remote device based on the received LLDP packets;
        when the AFC mode is not enabled on the remote device and no Link Aggregation Control Protocol (LACP) packets are received from the remote device on the at least one physical port, configuring the at least one physical port as a standalone port; and
        when the AFC mode is enabled on the remote device, automatically configuring a network fabric between the at least one physical port and the remote device, wherein the automatically configuring the network fabric further includes computer-executable instructions for:
            determining whether multiple physical ports of the plurality of physical ports are coupled to the remote device;
            when multiple physical ports are coupled to the remote device, automatically forming a link aggregation group including the multiple physical ports; and
            initializing a link aggregation timer when the LLDP packets are received from the remote device on a particular one of the multiple physical ports, the link aggregation timer being used to define a link aggregation time during which the multiple physical ports can be identified and the link aggregation group can be formed.

2. The network element of claim 1, wherein the determining whether multiple physical ports are coupled to the remote device further includes computer-executable instructions for:
    determining whether a system identification associated with the remote device is included within the LLDP packets received on each of the multiple physical ports;
    if the system identification associated with the remote device is included within the LLDP packets received on each of the multiple physical ports, determining that the multiple physical ports are coupled to the remote device.

3. The network element of claim 1, wherein the automatically forming the link aggregation group further includes computer-executable instructions for:
    exchanging LACP packets with the remote device on the multiple physical ports to configure the link aggregation group.

4. The network element of claim 1, wherein the automatically configuring the network fabric further includes computer-executable instructions for:
    upon expiration of the link aggregation timer, reserving a group of Virtual Local Area Networks (VLANs) as Shortest Path Bridging (SPB) VLANs;
    assigning a first SPB VLAN as a control Backbone VLAN (BVLAN); and
    forming SPB adjacencies with the remote device via the control BVLAN.

5. The network element of claim 4, wherein the automatically configuring the network fabric further includes computer-executable instructions for:
    initializing a SPB timer upon expiration of the link aggregation timer, the SPB timer defining a SPB time during which the SPB adjacencies are formed.

6. The network element of claim 5, wherein the automatically configuring the network fabric further includes computer-executable instructions for:
    upon expiration of the SPB timer, automatically transmitting Multiple VLAN Registration Protocol (MVRP) registration messages on the at least one physical port to discover and configure VLANs other than the SPB VLANs.

7. The network element of claim 1, wherein the computer-executable instructions further include instructions for enabling the AFC mode on each of the plurality of physical ports upon boot up of the network element.

8. The network element of claim 1, wherein the computer-executable instructions further include instructions for enabling the AFC mode on the at least one physical port upon manual configuration of the at least one physical port.

9. The network element of claim 1, wherein the computer-executable instructions further include instructions for:
    enabling the AFC mode on the at least one physical port; and
    initializing an AFC timer to define a time period during which the network fabric can be configured.

10. The network element of claim 1, wherein the computer-executable instructions further include instructions for:
    forming a virtual chassis with the remote device; and
    after the virtual chassis has been formed, enabling the AFC mode on the at least one physical port.

11. The network element of claim 1, wherein the computer-executable instructions further include instructions for:
    automatically saving a network fabric configuration of the network fabric into a configuration file for the network element.

12. A non-transitory memory device having accessible therefrom a set of instructions interpretable by at least one processor, the set of instructions configured for causing the processor to carry out operations for:
    transmitting Link Layer Discovery Protocol (LLDP) packets via at least one physical port of a plurality of physical ports of a network element within a data communication network, the LLDP packets including a Type Length Value (TLV) field indicating that an auto fabric configuration (AFC) mode is enabled on the at least one physical port;

receiving LLDP packets from a remote device on the at least one physical port;

determining whether the AFC mode is enabled on the remote device based on the received LLDP packets;

when the AFC mode is not enabled on the remote device and no Link Aggregation Control Protocol (LACP) packets are received from the remote device on the at least one physical port, configuring the at least one physical port as a standalone port; and when the AFC mode is enabled on the remote device, automatically configuring a network fabric between the at least one physical port and the remote device, wherein the set of instructions further causes the processor to carry out operations for:

when multiple physical ports are coupled to the remote device, automatically forming a link aggregation group including the multiple physical ports; and automatically reserving a group of Virtual Local Area Networks (VLANs) as Shortest Path Bridging (SPB) VLANs.

13. The memory device of claim 12, wherein the set of instructions further causes the processor to carry out operations for:

exchanging LACP packets with the remote device on the multiple physical ports to configure the link aggregation group.

14. The memory device of claim 12, wherein the set of instructions further causes the processor to carry out operations for:

assigning a first SPB VLAN as a control Backbone VLAN (BVLAN); and forming SPB adjacencies with the remote device via the control BVLAN.

15. The memory device of claim 14, wherein the set of instructions further causes the processor to carry out operations for:

automatically transmitting Multiple VLAN Registration Protocol (MVRP) registration messages on the at least one physical port to discover and configure VLANs other than the SPB VLANs.

16. A method for automatically configuring a network fabric between two network elements in a data communication network, the method comprising:

transmitting Link Layer Discovery Protocol (LLDP) packets via at least one physical port of a plurality of physical ports of a first network element within the data communication network, the LLDP packets including a Type Length Value (TLV) field indicating that an auto fabric configuration (AFC) mode is enabled on the at least one physical port;

receiving LLDP packets from a second network element on the at least one physical port;

determining whether the AFC mode is enabled on the second network element based on the received LLDP packets;

when the AFC mode is not enabled on the second network element and no Link Aggregation Control Protocol (LACP) packets are received from the remote device on the at least one physical port, configuring the at least one physical port as a standalone port; and when the AFC mode is enabled on the second network element, automatically configuring the network fabric between the at least one physical port and the second network element;

reserving a group of Virtual Local Area Networks (VLANs) as Shortest Path Bridging (SPB) VLANs;

assigning a first SPB VLAN as a control Backbone VLAN (BVLAN);

exchanging SPB control protocol TLV's on the control BVLAN;

forming SPB adjacencies with the second network element via the control BVLAN; and automatically transmitting Multiple VLAN Registration Protocol (MVRP) registration messages on the at least one physical port to discover and configure VLANs other than the SPB VLANs.

17. The method of claim 16, wherein the automatically configuring the network fabric further comprises:

determining whether multiple physical ports of the plurality of physical ports are coupled to the second network element; and if multiple physical ports are coupled to the second network element, automatically forming a link aggregation group including the multiple physical ports and running the LACP on the multiple physical ports.

* * * * *